US007490134B2

(12) United States Patent  
Ono et al.

(10) Patent No.: US 7,490,134 B2  
(45) Date of Patent: Feb. 10, 2009

(54) INFORMATION PROVIDING SYSTEM USING CODE INFORMATION

(75) Inventors: Yuji Ono, Osaka (JP); Fumitaka Toya, Tokyo (JP); Taku Ito, Kawasaki (JP); Kentaro Kitajima, Ichikawa (JP); Tohru Itoh, Ashiya (JP); Atsuyuki Naito, Ashiya (JP); Yoshito Hashimoto, Nishinomiya (JP); Hidehiko Yamamoto, Ikoma (JP); Hideto Nishikawa, Nara (JP); Hiroyoshi Naitoh, Nara (JP); Minehiro Konya, Daitou (JP)

(73) Assignee: Dentsu, Inc., Tokyo (JP)

( * ) Notice: Subject to any disclaimer, the term of this patent is extended or adjusted under 35 U.S.C. 154(b) by 664 days.

(21) Appl. No.: 10/503,011

(22) PCT Filed: Feb. 6, 2003

(86) PCT No.: PCT/JP03/01255

§ 371 (c)(1),  
(2), (4) Date: Jul. 29, 2004

(87) PCT Pub. No.: WO03/067441

PCT Pub. Date: Aug. 14, 2003

(65) Prior Publication Data

US 2005/0038872 A1   Feb. 17, 2005

(30) Foreign Application Priority Data

Feb. 8, 2002  (JP) .............................. 2002-032632

(51) Int. Cl.  
*G06F 15/16* (2006.01)  
*G06F 15/173* (2006.01)  
*G06K 19/06* (2006.01)  
*G06K 5/00* (2006.01)  
*G06K 7/10* (2006.01)

(52) U.S. Cl. .................. 709/217; 709/203; 709/219; 709/225; 709/226; 235/437; 235/462.1; 235/472; 235/494

(58) Field of Classification Search ................. 709/226, 709/225, 217, 218, 219, 245, 203, 205; 235/437, 235/462.09, 462.1, 462.11, 472, 494  
See application file for complete search history.

(56) References Cited

U.S. PATENT DOCUMENTS 5,426,700 A * 6/1995 Berson ....................... 713/186

(Continued)

FOREIGN PATENT DOCUMENTS

EP    1 045 322 A2   10/2000

(Continued)

*Primary Examiner*—Saleh Najjar  
*Assistant Examiner*—Farzana Huq  
(74) *Attorney, Agent, or Firm*—Paul F. Neils, Esq.; Akerman Senterfitt (57) ABSTRACT

By using code information, it is possible to easily and accurately direct users to interactive media. The code-issuing server system 10 issues 2-dimensional code information according to a request, an advertiser server system 20 receives the issued 2-dimensional code information and an advertiser server 21 manages the received 2-dimensional code information, a portable telephone 30 having an imaging function that uses a CCD camera photographs the 2-dimensional code information, obtains a Web address that is contained in the photographed 2-dimensional code information and accesses a Web page via the Internet 40 using the obtained Web address, and the advertiser server system 20 supplies information to the portable telephone 30 via the Internet 40 in response to access from the portable telephone 30.

16 Claims, 6 Drawing Sheets

U.S. PATENT DOCUMENTS

| | | | |
|---|---|---|---|
| 5,671,282 A * | 9/1997 | Wolff et al. | 713/179 |
| 5,938,726 A * | 8/1999 | Reber et al. | 709/217 |
| 6,144,848 A * | 11/2000 | Walsh et al. | 455/419 |
| 6,144,997 A * | 11/2000 | Lamming et al. | 709/217 |
| 6,189,009 B1 * | 2/2001 | Stratigos et al. | 707/10 |
| 6,366,771 B1 * | 4/2002 | Angle et al. | 455/414.1 |
| 6,386,453 B1 * | 5/2002 | Russell et al. | 235/462.01 |
| 6,546,418 B2 * | 4/2003 | Schena et al. | 709/219 |
| 6,655,597 B1 * | 12/2003 | Swartz et al. | 235/462.45 |
| 6,685,093 B2 * | 2/2004 | Challa et al. | 235/462.46 |
| 6,707,581 B1 * | 3/2004 | Browning | 358/473 |
| 6,725,220 B2 * | 4/2004 | Stratigos et al. | 707/10 |
| 6,865,608 B2 * | 3/2005 | Hunter | 709/229 |
| 7,203,158 B2 * | 4/2007 | Oshima et al. | 370/208 |
| 2001/0051996 A1 * | 12/2001 | Cooper et al. | 709/217 |
| 2002/0126780 A1 * | 9/2002 | Oshima et al. | 375/347 |

FOREIGN PATENT DOCUMENTS

| | | |
|---|---|---|
| JP | 07-296099 | 11/1995 |
| JP | 07-320013 | 12/1995 |
| JP | 10-187572 | 7/1998 |
| JP | 10-228526 | 8/1998 |
| JP | 10-320410 | 12/1998 |
| JP | 2000-047958 | 2/2000 |
| JP | 2000-057079 | 2/2000 |
| JP | 2000-057210 | 2/2000 |
| JP | 2000-215207 | 8/2000 |
| JP | 2000-299847 | 10/2000 |
| JP | 2000-341657 | 12/2000 |
| JP | 2000-357174 A | 12/2000 |
| JP | 2000-357189 | 12/2000 |
| JP | 2001-005883 | 1/2001 |
| JP | 2001-211306 | 8/2001 |
| JP | 2001-243503 | 9/2001 |
| JP | 2001-243503 A | 9/2001 |
| JP | 2001-256139 | 9/2001 |
| JP | 2001-296957 | 10/2001 |
| JP | 2001-306616 | 11/2001 |
| JP | 2001-318929 | 11/2001 |
| JP | 2001-357167 | 12/2001 |
| JP | 2001-357278 | 12/2001 |
| JP | 2002-007345 | 1/2002 |
| JP | 2002-009759 | 1/2002 |
| JP | 2002-013741 | 1/2002 |
| JP | 2002-015211 | 1/2002 |
| JP | 2002-016592 | 1/2002 |
| JP | 2002-024178 | 1/2002 |
| JP | 2002-041832 | 2/2002 |
| JP | 2002-183425 | 6/2002 |
| JP | 2002-197364 | 7/2002 |
| JP | 2002-202784 | 7/2002 |
| JP | 2002-260099 | 9/2002 |
| JP | 2002-260100 | 9/2002 |
| JP | 2002-314612 A | 10/2002 |
| JP | 2004-078351 | 3/2004 |
| WO | WO 98/20411 A1 | 5/1998 |
| WO | WO 98/24049 | 6/1998 |
| WO | WO 98/24049 A1 | 6/1998 |
| WO | WO 00/42748 | 7/2000 |
| WO | WO 00/42748 A1 | 7/2000 |
| WO | WO 01/67367 | 9/2001 |

\* cited by examiner

INFORMATION PROVIDING SYSTEM USING CODE INFORMATION

CROSS REFERENCE TO RELATED APPLICATION

This application is a national stage of PCT/JP03/01255 filed Feb. 6, 2003 and is based upon Japanese Patent Application No. 2002-032632, filed Feb. 8, 2002 under the International Convention.

BACKGROUND OF THE INVENTION

1. Field of the Invention

This invention relates to an information-supply system that uses code information.

2. Description of the Related Art

With the development of communications and network technology, and with the advancement of computer technology, the representative standard of interactive media of the Internet is changing from narrow band to broadband.

In Japan, by adding an Internet function to portable telephones, there is an overwhelmingly larger number of Internet users that use the Internet using portable telephones (so-called browser-phone users) than compared with the number of Internet users that use a personal computer as in Europe or the United States.

Many of these users that use a browser phone enjoy electronic mail by portable telephone, and obtain information by accessing Web pages that correspond to a browser phone.

The Web address of a contents supplier is registered in the official menu of a carrier service by being authorized by a portable telephone company (so-called carrier). In this case, it is possible to access a Web page by accessing certain contents using the menu registered by the carrier.

However, in order to be registered by the carrier, there is a rather high hurdle or inspection that must be passed, and not everyone can be registered. Therefore, a non-registered contents supplier sends information using their own URL. This is called a so-called voluntary site.

However, in the case in which this kind of contents supplier uses a personal URL, the browser-phone user performs access by either accessing that URL using key input, or accessing a URL attached to an e-mail (web to).

However, the operation for this kind of inputting or selection of the URL is complicated. Therefore, the method used by most browser-phone users to access information simply is number-code access that uses a free-dial telephone number, for example. This is a method of converting Internet address information to specified number information, and Internet numbers or Chinese character (Kanji) URLs or the like are used. However, in this method, the numbers that can be used and the numbers and Chinese characters desired to be used by the user do not always match, and so from this aspect it is considered that there is still room for improvement.

SUMMARY OF THE INVENTION

It is the object of the present invention to provide an information-supply system that uses code information that makes the use of interactive media more attractive by using code information and removing the problems mentioned above.

The information-supply system that uses code information according to the first claim of the invention comprises: a code-issuing server system that issues code information according to a request via a network; an information-supply server system that receives the issued code information via the network and manages the received code information; and a portable terminal having a imaging function that uses an imaging element, and that photographs the code information, obtains a Web address that is contained in the photographed code information, and accesses a Web page via the network using the obtained Web address; and where the information-supply server system supplies information to the portable terminal via the network in response to access from the portable terminal.

Also, the code-issuing server system can be such that it comprises a code-issuing-management server that manages the issued code information and supplies a JAVA (registered trademark) application that is used on the portable terminal side to decode the code information; and where the information-supply server system comprises an information-supply server that supplies various kinds of information in response to access from the portable terminal using the Web address; and where the portable terminal comprises: a reading unit that uses the JAVA (registered trademark) application to extract and read the code information that was photographed by the imaging element; a decoding unit that uses the JAVA (registered trademark) application to decode the code information that was read by the reading unit; a browsing-function unit, which by accessing the code-issuing-management server, downloads the JAVA (registered trademark) application, and after accessing a Web page according to the Web address decoded by the decoding unit and receiving detailed information from the accessed destination, displays that detailed information; a memory unit that stores the code information read by the reading unit and the downloaded JAVA (registered trademark) application; and a control unit that controls the operation of each unit according to a specified control program.

Moreover, when the decoding unit decodes the code information and the control unit determines that the JAVA (registered trademark) application is not stored in the memory unit, the control unit sends an instruction to the browsing-function unit to download the JAVA (registered trademark) application.

Also, the code-issuing server system can be such that after a secret key is received from the information-supply server system, it encodes part of the character string of the code information to generate an encoded portion, and issues code information that is a combination of that encoded portion and an open portion; and where the information-supply server system comprises: an open-key management server that manages an open key for decoding the encoded portion of the code information; and a secret-key-management server that manages the secret key that is used when generating the encoded portion of the code information that is issued by the code-issuing server system; and where after the decoding unit decodes the open portion of the code information, the portable terminal performs access by the browsing-function unit based on the decoded information of the open portion.

Also, the browsing-function unit can be such that after the secret key is received by access based on information of the decoded open portion and after the encoded portion of the code information is decoded by the decoding unit using the secret key, it accesses a Web page based on the decoded Web address.

Moreover, the browsing-function unit can be such that after the secret key is received by access based on information of the decoded open portion, and after the encoded portion of the code information is decoded by the decoding unit using the secret key, it executes action according to the information of the decoded encoded portion.

Also, an IP address can be contained in the open portion of the code information, and information linked to the IP address can be contained in the encoded portion.

Moreover, the code information can be at least 2-dimensional code.

Also, the portable terminal can be such that it executes a specified function according to information contained in the photographed code information.

Also, the code information can be such that it comprises at least 2-dimensional code and bitmap information in addition to this 2-dimensional code, and where the function of reading at least the 2-dimensional code or the operation after reading can be changed according to the bitmap information.

Moreover, the Web address that is contained in the code information obtained on the side of the portable terminal can be such that it is decoded on the side of the code-issuing server system.

The information-supply method that uses code information according to the twelfth claim of the invention comprises: a first process of issuing code information by a code-issuing server system according to a request via a network; a second process of receiving the issued code information by the information-supply server system via the network and managing the received code information; a third process of photographing the code information by a portable terminal having an imaging function that uses an imaging element and obtaining a Web address contained in that photographed code information and then accessing a Web page via the network using the obtained Web address; and a fourth process of supplying information to the portable terminal via the network in response to access from the portable terminal.

Also, construction can be such that the first process includes a fifth process of managing the issued code information by a code-issuing-management server, and supplying a JAVA (registered trademark) application to be used by the portable terminal for decoding the code information; the second process includes a sixth process of supplying various kinds of information in response to access using the Web address from the portable terminal; and the third process includes: a seventh process of using the JAVA (registered trademark) application by a reading unit to extract and read the code information that was photographed by the imaging element; an eighth process of using the JAVA (registered trademark) application by a decoding unit to decode the code information read by the reading unit; a ninth process of downloading the JAVA (registered trademark) application by accessing the code-issuing-management server by a browsing-function unit, and then accessing the Web page based on the Web address decoded by the decoding unit, receiving detailed information from the accessed destination and displaying that detailed information; a tenth process of storing the code information read by the reading unit and the downloaded JAVA (registered trademark) application in a memory unit; and an eleventh process of controlling the operation of each unit by a control unit according to a specified control program.

Moreover, the eleventh process can be such that it includes a twelfth process of sending an instruction to the browsing-function unit to download the JAVA (registered trademark) application when it is determined that the JAVA (registered trademark) application is not stored in the memory unit when the decoding unit decodes the code information.

Moreover, the eleventh process can be such that it includes: a thirteenth process of encoding part of the aforementioned character string by the code-issuing server system to generate an encoded portion when the secret key is received from the information-supply server system, and issuing code information that is a combination of that encoded portion and open portion; a fourteenth process in which the information-supply server manages an open key for decoding the encoded portion of the code information by the open-key-management server; and a fifteenth process in which a secret-key-management server manages the secret key that is used when generating the encoded portion of the code information that is issued on the side of the code-issuing server system; and can also include a sixteenth process in which when the open portion of the code information is decoded by the decoding unit, the portable terminal performs access by the browsing-function unit based on the information of the decoded open portion.

Also, the sixteenth process can be such that it includes a seventeenth process in which after the secret key is received by performing access based on the information of the decoded open portion, and after the decoding unit decodes the encoded portion of the code information using the secret key, the browsing-function unit performs access of the Web page based on the decoded Web address.

Also, an IP address can be contained in the open portion of the code information and a Web address can be contained in the encoded portion.

The code information can be at least 2-dimensional code.

Moreover, the Web address contained in the code information obtained on the side of the portable terminal can be such that it is decoded on the side of the code-issuing server system.

The program executes the information-supply method that uses code information of any of the following processes:

1. a first process of issuing code information by a code-issuing server system according to a request via a network; a second process of receiving said issued code information by an information-supply server system via said network and managing said received code information; a third process of photographing said code information by a portable terminal having an imaging function that uses an imaging element and obtaining the Web address contained in said photographed code information and then accessing a Web page via said network using said obtained Web address; and a fourth process of supplying information by said information-supply server system to said portable terminal via said network in response to access from said portable terminal.

2. A first process of issuing code information by a code-issuing server system according to a request via a network; a second process of receiving said issued code information by an information-supply server system via said network and managing said received code information; a third process of photographing said code information by a portable terminal having an imaging function that uses an imaging element and obtaining the Web address contained in said photographed code information and then accessing a Web page via said network using said obtained Web address; a fourth process of supplying information by said information-supply server system to said portable terminal via said network in response to access from said portable terminal; a fifth process of managing said issued code information by a code-issuing-management server, and supplying a JAVA (registered trademark) application to be used by said portable terminal for decoding said code information; said second process includes a sixth process of supplying various kinds of information by an information-supply server in response to access using said Web address from said portable terminal; and said third process includes: a seventh process of using the JAVA (registered trademark) application by a reading unit to extract and read said code information that was photographed by an imaging element; an eighth process of using said JAVA (registered trademark) application by a decoding unit to decode said code information read by said reading unit; a ninth process of downloading said JAVA (registered trademark) application by accessing said code-issuing-management server by a browsing-function unit, and then accessing said Web page based on the Web address decoded by said decoding unit, receiving detailed information from the accessed destination and displaying that detailed information; a tenth process of storing said code information read by said reading unit and said downloaded JAVA (registered trademark) application in a memory unit; and an eleventh process of controlling the operation of each unit by a control unit according to a specified control program.

3. A first process of issuing code information by a code-issuing server system according to a request via a network; a second process of receiving said issued code information by an information-supply server system via said network and managing said received code information; a third process of photographing said code information by a portable terminal having an imaging function that uses an imaging element and obtaining the Web address contained in said photographed code information and then accessing a Web page via said network using said obtained Web address; a fourth process of supplying information by said information-supply server system to said portable terminal via said network in response to access from said portable terminal; a fifth process of managing said issued code information by a code-issuing-management server, and supplying a JAVA (registered trademark) application to be used by said portable terminal for decoding said code information; said second process includes a sixth process of supplying various kinds of information by an information-supply server in response to access using said Web address from said portable terminal; and said third process includes: a seventh process of using the JAVA (registered trademark) application by a reading unit to extract and read said code information that was photographed by an imaging element; an eighth process of using said JAVA (registered trademark) application by a decoding unit to decode said code information read by said reading unit; a ninth process of downloading said JAVA (registered trademark) application by accessing said code-issuing-management server by a browsing-function unit, and then accessing said Web page based on the Web address decoded by said decoding unit, receiving detailed information from the accessed destination and displaying that detailed information; a tenth process of storing said code information read by said reading unit and said downloaded JAVA (registered trademark) application in a memory unit; an eleventh process of controlling the operation of each unit by a control unit according to a specified control program; and the eleventh process includes a twelfth process of sending an instruction to said browsing-function unit to download said JAVA (registered trademark) application when it is determined that said JAVA (registered trademark) application is not stored in said memory unit when said decoding unit decodes said code information.

4. A first process of issuing code information by a code-issuing server system according to a request via a network; a second process of receiving said issued code information by an information-supply server system via said network and managing said received code information; a third process of photographing said code information by a portable terminal having an imaging function that uses an imaging element and obtaining the Web address contained in said photographed code information and then accessing a Web page via said network using said obtained Web address; a fourth process of supplying information by said information-supply server system to said portable terminal via said network in response to access from said portable terminal; and thirteenth process of encoding part of said character string by said code-issuing server system to gentrate an encoded portion when a secret key is received from said information-supply server system, and issuing said code information that is a combination of that encoded portion and an open portion; a fourteenth process in which said information-supply server manages an open key for decoding the encoded portion of said code information by an open-key management server; a fifteenth process in which a secret-key management server manages said secret key that is used when generating the encoded portion of said code information that is issued on the side of said code-issuing server sysstem; and a sixteenth process in which when open portion of said code information is dedoced by said decoding unit, said portable terminal performs access by said browsing-function unit based on the information of said decoded open portion.

5. A first process of issuing code information by a code-issuing server system according to a request via a network; a second process of receiving said issued code information by an information-supply server system via said network and managing said received code information; a third process of photographing said code information by a portable terminal having an imaging function that uses an imaging element and obtaining the Web address contained in said photographed code information and then accessing a Web page via said network using said obtained Web address; a fourth process of supplying information by said information-supply server system to said portable terminal via said network in response to access from said portable terminal; a fifth process of managing said issued code information by a code-issuing-management server, and supplying a JAVA (registered trademark) application to be used by said portable terminal for decoding said code information; said second process includes a sixth process of supplying various kinds of information by an information-supply server in response to access using said Web address from said portable terminal; and said third process includes: a seventh process of using the JAVA (registered trademark) application by reading unit to extract and read said code information that was photographed by an imaging element; an eighth process of using said JAVA (registered trademark) application b;y a decoding unit to decode said code information read said reading unit; a ninthe process of downloading said JAVA (registered trademark) application by accessing said code-issuing-management server by browsing-function unit, and then accessing said Web page based on the Web address decoded by said decoding unit, receiving detailed information from the accessed destination and displaying that detailed information; a tenth process of storing said code information read by said reading unit and said downloaded JAVA (registered trademark) application in a memory unit; an eleventh process of controlling the operation of each unit by a control unit according to a specified control program; a thirteenth process of encoding part of said character string by said code-issuing server system to generate an encoded portion when a secret key is received from said information-supply server system, and issuing said code information that is a combination of that encoded portion and an open portion; a fourteenth process in which said information-supply server manages an open key for decoding the encoded portion of said code information by an open-key-management server; a fifteenth process in which a secret-key-management server manages said secret key that is used whern generating the encoded potion of said code information that is issued on the side of said code-issuing server systemp and a sixteenth procss in which when the open portion of said code information is decoded by said decoding unit, said portable terminal performs access by said browsing-function unit based on the information of said decoded open portion.

6. A first process of issuing code information a code-issuing server system according to a request via a network; a second process of receiving said issued code information by an information-supply server system via said network and managing said received code information; a third process of photographing said code information by a portable terminal having a imaging function that uses an imaging element and obtaining the Web address contained in said photographed code information and the accessing a Web page via said network using said obtained Web address; a fourth process of supplying information by said information-supply server system to said portable terminal via said network in response to access from said portable terminal; and a thirteenth process of encoding part of said character string by said code-issuing server system to generate an encoded portion when a secret key is received from said information-supply server system, and issuing said code information that is a combination of that encoded portion and an open portion; a fourteenth process in which said information-supply server manages an open key for decoding the encoded portion of said code information by an open-key-management server; a fifteenth process in which a secret-key-management server manages said secret key that is used when generating the encoded portion of said code information that is issued on the side of said code-issuing server system; a sixteenth process in which when the open portion of said code information is decoded by said decoding unit, said portable terminal performs access by said browsing-function unit based on the information of said decoded open portion; and the sixteenth process includes a seventeenth process in which after said secret key is received by performing access based on the information of said decoded open portion, and after said decoding unit decodes the encoded portion of said code information using said secret key, said browsing-function unit performs access of said Web page based on said decoded Web address.

7. A first process of issuing code information by a code-issuing server system according to a request via a network; a second process of receiving said issued code information by an information-supply server system via said network and managing said received code information; a third process of photographing said code information by a portable terminal having a imaging function that uses an imaging element and obtaining the Web address contained in said photographed code information and then accessing a Web page via said network using said obtained Web address; a fourth process of supplying information by said information-supply server system to said portable terminal via said network in response to access from said portable terminal; a fifth process of managing said issued code information by a code-issuing-management server, and supplying a JAVA (registered trademark) application to be used by said portable terminal for decoding said code information; said second process includes a sixth process of supplying various kinds of information by an information-supply server in response to access using said Web address from said portable terminal; and said third process includes: a seventh process of using the JAVA (registered trademark) application by a reading unit to extract and read said code information that was photographed by an imaging element; an eighth process of using said JAVA (registered trademark) application by a decoding unit to decode said code information read by said reading unit; a ninth process of downloading said JAVA (registered trademark) application by accessing said code-issuing-management server by a browsing-function unit, and then accessing said Web page based on the Web address decoded by said decoding unit, receiving detailed information from the accessed destination and displaying that detailed information; a tenth process of storing said code information read by said reading unit and said downloaded JAVA (registered trademark) application in a memory unit; an eleventh process of controlling the operation of each unit by a control unit according to a specified control program; a thirteenth process of encoding part of said character string by said code-issuing server system to generate an encoded portion when a secret key is received from said information-supply server system, and issuing said code information that is a combination of that encoded portion and an open portion; a fourteenth process in which said information-supply server manages an open key for decoding the encoded portion of said code information by an open-key-management server; a fifteenth process in which a secret-key-management server manages said secret key that is used when generating the encoded portion of said code information that is issued on the side of said code-issuing server system; a sixteenth process in which when the open portion of said code information is decoded by said decoding unit, said portable terminal performs access by said browsing-function unit based on the information of said decoded open portion; and the sixteenth process includes a seventeenth process in which after said secret key is received by performing access based on the information of said decoded open portion, and after said decoding unit decodes the encoded portion of said code information using said secret key, said browsing-function unit performs access of said Web page based on said decoded Web address.

A program that executes the information-supply method that uses code information of any one of the processes set out above in 1-7 is recorded on the recording medium on which a program is recorded that executes the information-supply method that uses code information of any one of the processes set out above in 1-7 of the invention.

In the information-supply system that uses code information of this invention, the code-issuing server system issues code information according to a request via a network, a information-supply server system receives the issued code information via the network and manages the received code information, a portable terminal having an imaging function that uses an imaging element photographs the code information, obtains a Web address that is contained in the photographed code information and accesses a Web page via the network using the obtained Web address, and an information-supply server system supplies information to the portable terminal via the network in response to access from the portable terminal.

DESCRIPTION OF THE PREFERRED
EMBODIMENTS OF THE INVENTION

The present invention will be explained in more detail with reference to the supplied drawings.

Embodiment 1

Figure 1:
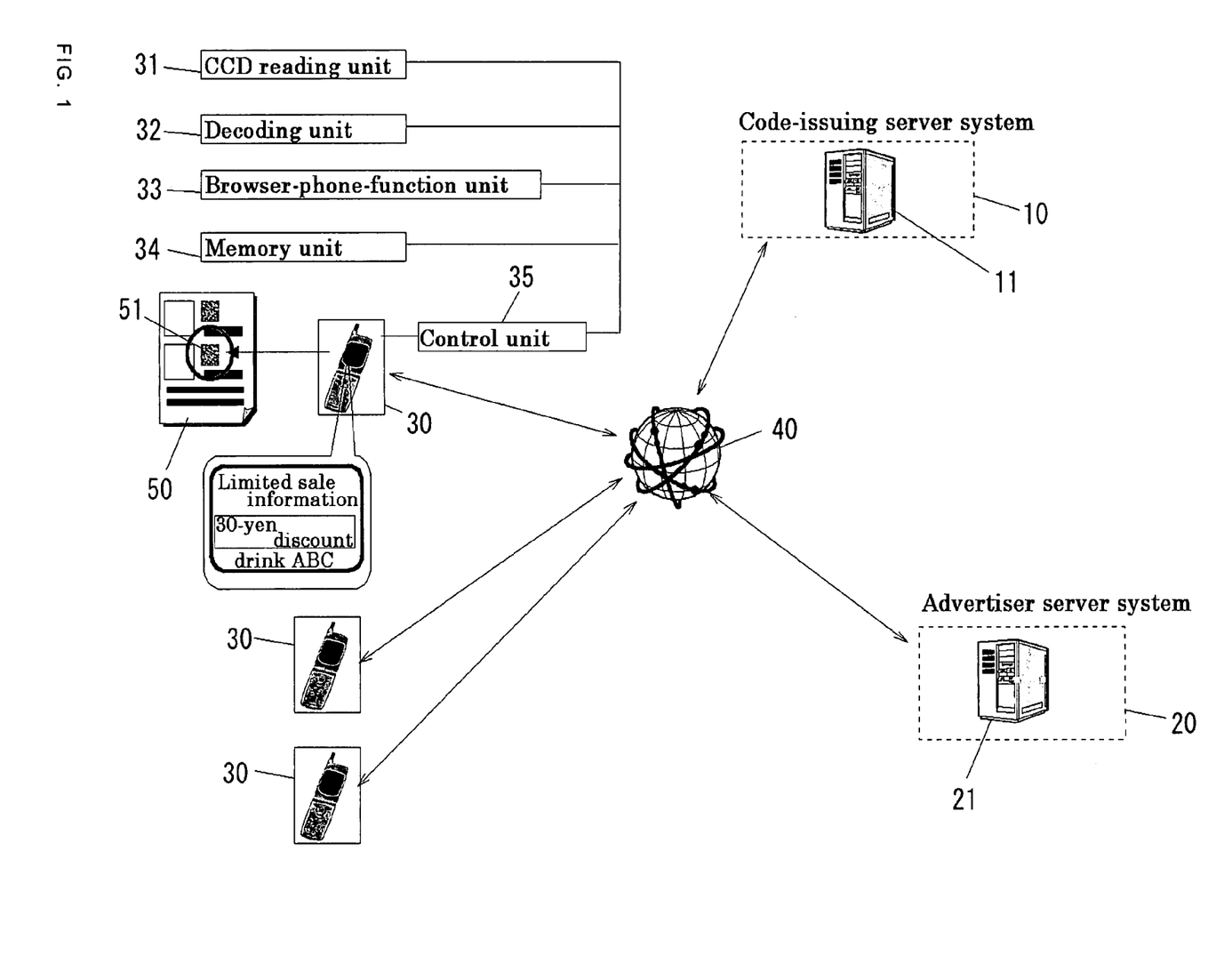
FIG. 1 is a drawing showing a first embodiment of an information-supply system that uses code information of the present invention.
Figure 2:
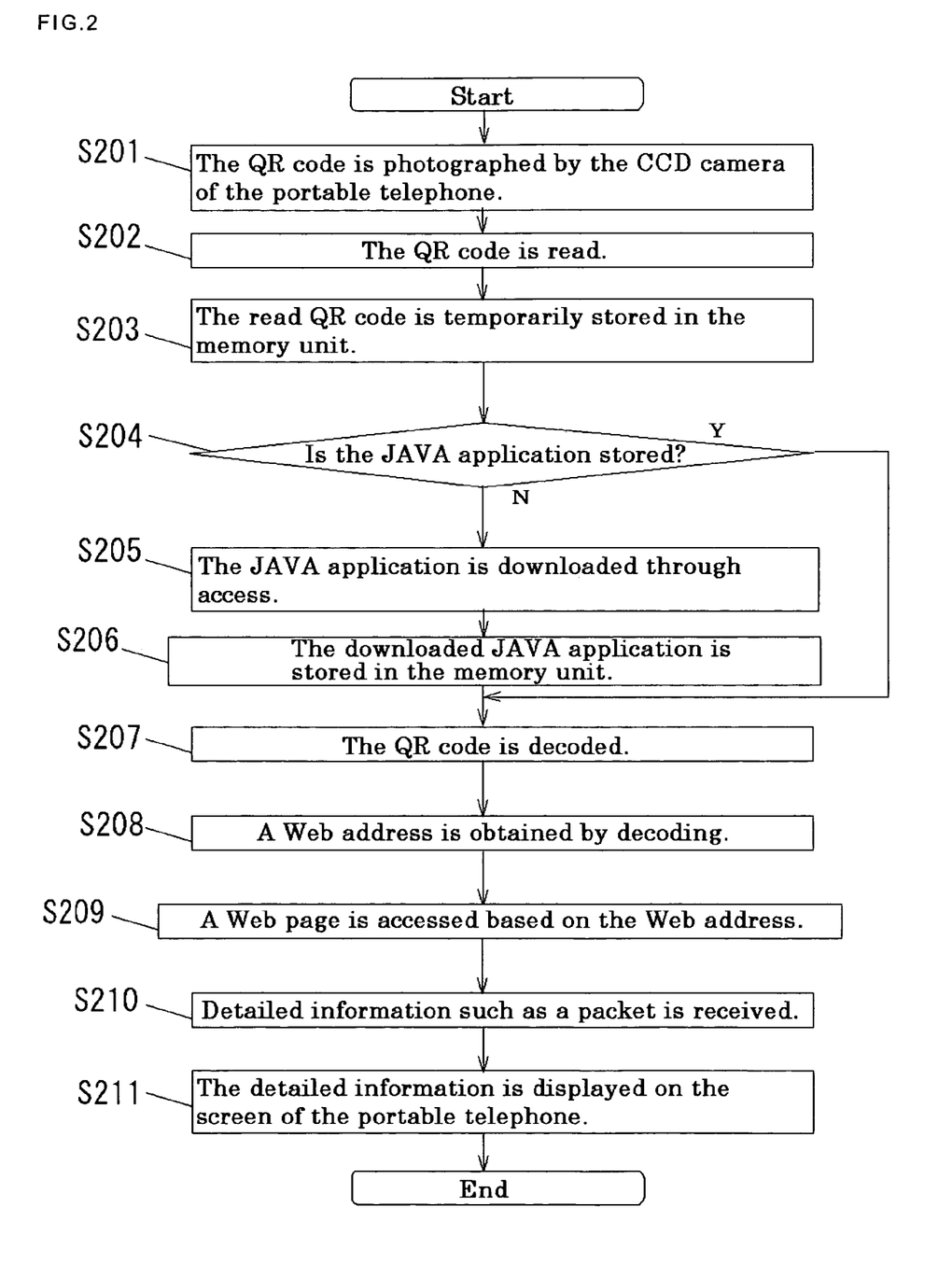
FIG. 2 is a flowchart for explaining the information-supply method of the information-supply system that uses code information shown in FIG. 1.

FIG. 1 is a drawing showing a first embodiment of the information-supply system that uses code information of the present invention; and FIG. 2 is a flowchart for explaining the information-supply method of the information-supply system that uses code information shown in FIG. 1.

As shown in FIG. 1, the information-supply system that uses code information comprises: a code-issuing server system 10, an advertiser server system 20 and a portable telephone 30. The code-issuing server system 10, advertiser server system 20 and portable telephone 30 are such that they can communicate with each other via the Internet 40 as a network. This network is not limited to the Internet 40 and could also be a dedicated line or the like.

The code-issuing server system 10 issues 2-dimensional code information, for example, as code information according to a request from the advertiser, and it comprises a code-issuing-management server 11. The code-issuing-management server 11 manages the 2-dimensional code information that is issued according to the request from the advertiser, as well as provides a JAVA (registered trademark) application for decoding the 2-dimensional code information that is used on the side of the portable telephone 30.

The advertiser server system 20 that functions as an information-supply server system manages 2-dimensional code information that is issued by the code-issuing server system 10, and it comprises an advertiser server 21. The advertiser server 21 supplies various kinds of information according to access using 2-dimensional code information from the portable telephone 30.

The 2-dimensonal code information that is issued can be printed and distributed in distribution materials for example. The distribution materials could include newspapers, magazines, advertisements, company pamphlets, folded leaflets or inserts, OOH (Out Of Home) media, POP, tickets, calling cards, tags, etc.

By printing 2-dimensional code information in these distribution materials, not only does it become possible to direct the user to an advertising campaign site from the portable telephone 30, it also becomes possible to use the materials in various kinds of businesses such as ticket reservations and accounting (or payment), sales, accounting (or payment) services, TV program programming services, B2B or the like.

Also, as described above, by printing 2-dimensional code in distribution materials in this way, it is not necessary to register a Web address by authorization from the portable telephone company (so-called carrier), and thus it becomes easier for any kind of business to participate, and it is possible to provide an environment in which it is easier to create new businesses. In other words, in the service provided by a current carrier, there are two kinds of sites: official sites and non-official sites (called so-called free sites). There would be no problem if all contents and services were designated as official sites, however, certification on the side of the carrier is difficult and takes time, so it is difficult for all sites to become official sites.

Incidentally, in pay services such as dial Q2 services provided by a telephone company as well, services are provided in which similarly the contents owner and service destination are bundled. This is in order that the communication lines of the telephone company are not allowed to be used freely. Therefore, it becomes possible for the telephone company to freely cancel services that are considered by the telephone company to be bad services (indecent services, etc).

On the other hand, the Internet does not perform this kind of action, so the sender and user judge a Web site through free dealing. In this case, it is presumed that the user receives the service while performing a certain judgment, and as one method, based on correlation with paper media, service information is obtained from the paper media and it is determined whether or not to jump to the service site. The carrier does not control these services, but rather business is carried out in a relationship of trust between the sender and user, so as a result, it is possible for any kind of business to participate.

Also, for a browser-phone user that uses a portable telephone 30, access by entering a URL, access by selecting a URL that is attached to an e-mail (web to), or access by entering information converted to numbers or Chinese characters (Kanji) onto a specific page is not necessary.

The portable telephone 30, which functions as a portable terminal, has an imaging function that uses a camera having an imaging element which is a CCD, and comprises: a CCD reading unit 31, decoding unit 32, browser-phone function unit 33, memory unit 34 and control unit 35.

The CCD reading unit 31 reads image data that is photographed by the CCD camera. Here, the image data can be either still images or moving images as long as they can be obtained by the imaging element. In this embodiment, QR code 51 is extracted and read as 2-dimensional code information that is printed in printed materials 50 such as magazines or the like. The QR code 51 that is read by the CCD reading unit 31 is temporarily stored in the memory unit 34.

The decoding unit 32 decodes the QR code 51 that was read by the CCD reading unit 31. When decoding the QR code 51, a JAVA (registered trademark) application, which is decoding software, is used. This JAVA (registered trademark) application can be downloaded by accessing the code-issuing-management server 11. The downloaded JAVA (registered trademark) application is stored in the memory unit 34.

The browser-phone function unit 33, which functions as the browsing function unit, accesses a Web page based on the Web address that was decoded by the decoding unit 32 according to a specified control program, and after receiving detailed information such as a packet from the accessed destination, it displays that detailed information on the screen of the portable telephone 30. Also, the browser-phone function unit 33 is such that is performs the download of the JAVA (registered trademark) application.

The QR code 51 that is read by the CCD reading unit 31 and the downloaded JAVA (registered trademark) application are stored in the memory unit 34. The control unit 35 controls the operation of each component according to a specified control program.

Next, the information-supply method of the information-supply system that uses the 2-dimensional code having this kind of configuration will be explained.

First, as shown in FIG. 2, after the CCD camera of the portable telephone 30 photographs the QR code 51 as the 2-dimensional code information to be printed in the printed materials 50 such as magazines (step 201), the CCD reading unit 31 reads that photographed QR code 51 (step 202).

The QR code 51 read by the CCD reading unit 31 is temporarily stored in the memory unit 34 (step 203). After the QR code 51 is stored in the memory unit 34, the decoding unit 32 decodes the QR code 51. At this time, decoding of QR code 51 is executed by calling up the JAVA (registered trademark) application, which is decoding software for decoding the QR code 51, from the memory unit 34, however, when the control unit 35 determines that the JAVA (registered trademark) application is not stored (step 204), the browser-phone function unit 33 accesses the code-issuing-management server 11 according to an instruction from the control unit 35, and the JAVA (registered trademark) application is downloaded (step 205). The downloaded JAVA (registered trademark) application is then stored in the memory unit 34 (step 206).

After the JAVA (registered trademark) application has been obtained in this way, the decoding unit 32 decodes the QR code 51 (step 207). At this time, the Web address is obtained by decoding the QR code 51 (step 208), and the browser-phone function unit 33 accesses the Web page based on that Web address (step 209). Also, after receiving detailed information such as a packet from the accessed destination (step 210), that detailed information is displayed on the screen of the portable telephone 30 (step 211).

In this way, in the first embodiment, the code-issuing server system 10 issues 2-dimensional code information according to a request via the Internet 40, and after the advertiser server system 20 receives the issued 2-dimensional code via the Internet 40, the advertiser server 21 manages the received 2-dimensional code, and the portable telephone 30, having an imaging function that uses a CCD camera, photographs the 2-dimensional code information and obtains the Web address that is contained in the photographed 2-dimensional code information, and then uses the obtained Web address to access the Web page via the Internet 40, then in response to access from the portable telephone 30, the advertiser server system 20 supplies information to the portable telephone 30 via the Internet 40.

In this way, as in the past, even though the contents supplier does not register their own Web address in the menu of the carrier service by receiving authorization from the portable telephone company (so-called carrier), it is possible to print and distribute the 2-dimensional code information that is issued by the code-issuing server system 10 in distribution materials such as advertisements, company pamphlets, folded leaflets or inserts, OOH media, POP, tickets, calling cards, tags, etc., so it becomes possible to easily direct many browser-phone users to interactive media.

On the other hand, many browser-phone users that use portable telephones 30 can access a desired Web page by using the CCD camera in their portable telephone 30 to photograph the 2-dimensional code information that is printed in distributed materials, so there is no need to enter the contents supplier's own URL as was done conventionally, and it is possible to very easily and accurately access interactive media.

Embodiment 2

Figure 3:
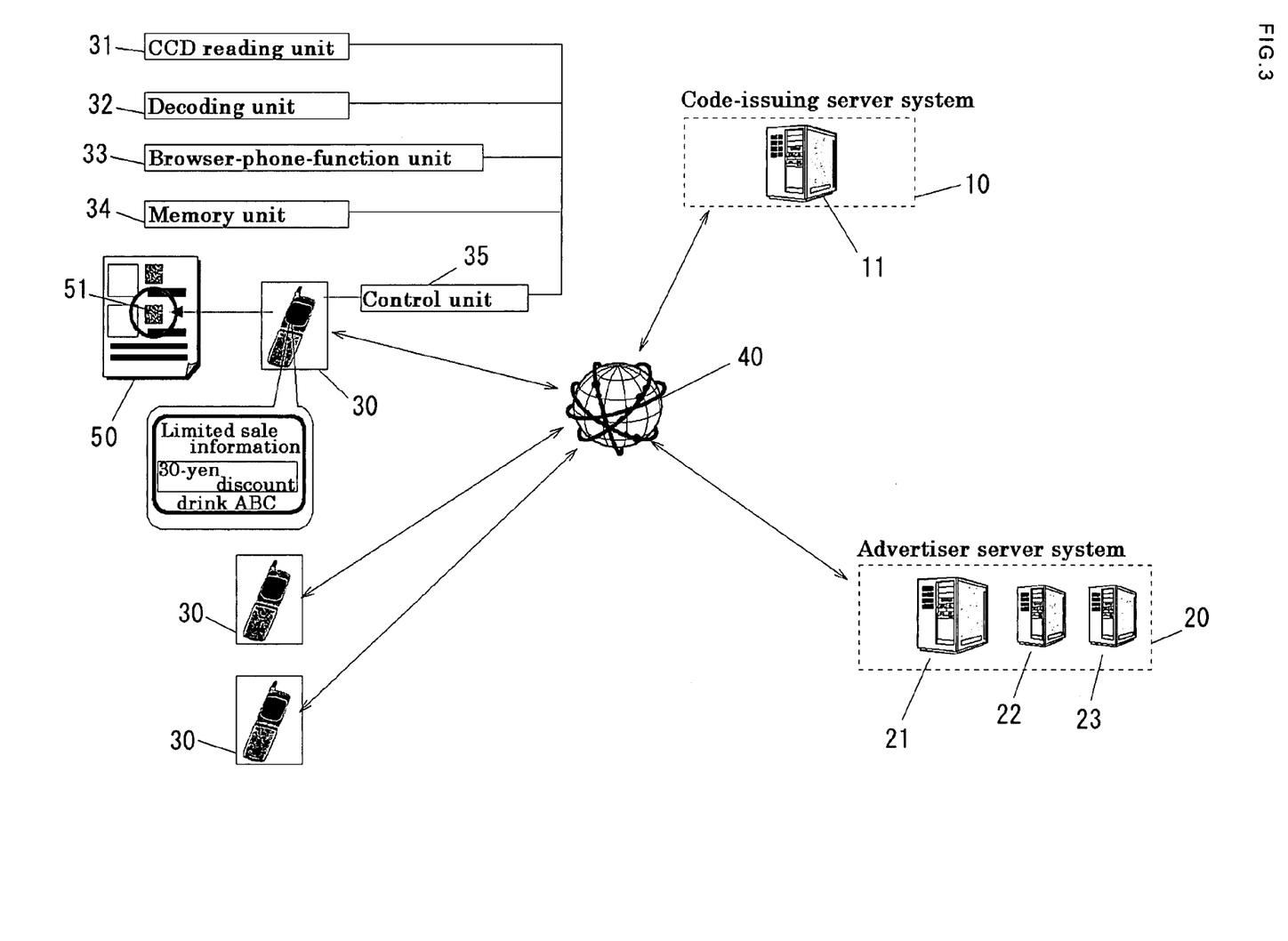
FIG. 3 is a drawing showing a second embodiment of the information-supply system that uses code information shown in FIG. 1 having changed construction.
Figure 4:
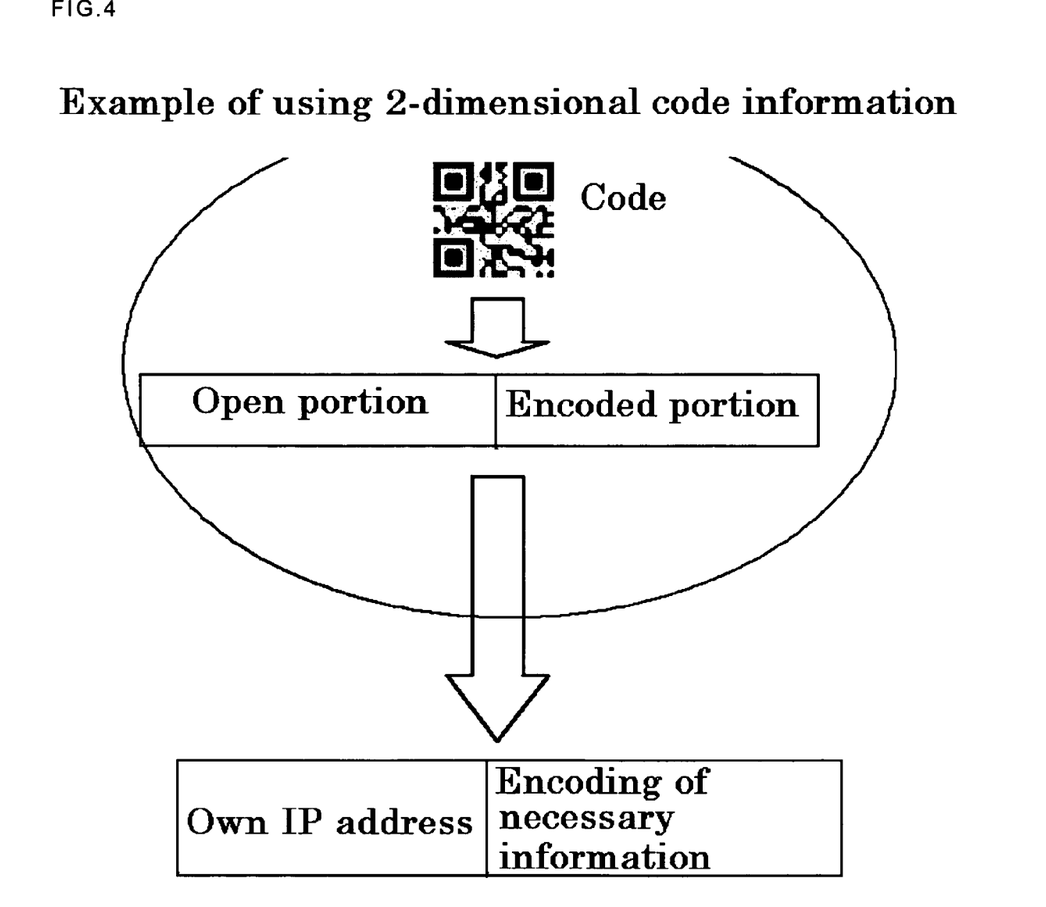
FIG. 4 is a drawing for explaining the operation of the information-supply system that uses code information shown in FIG. 3.
Figure 5:
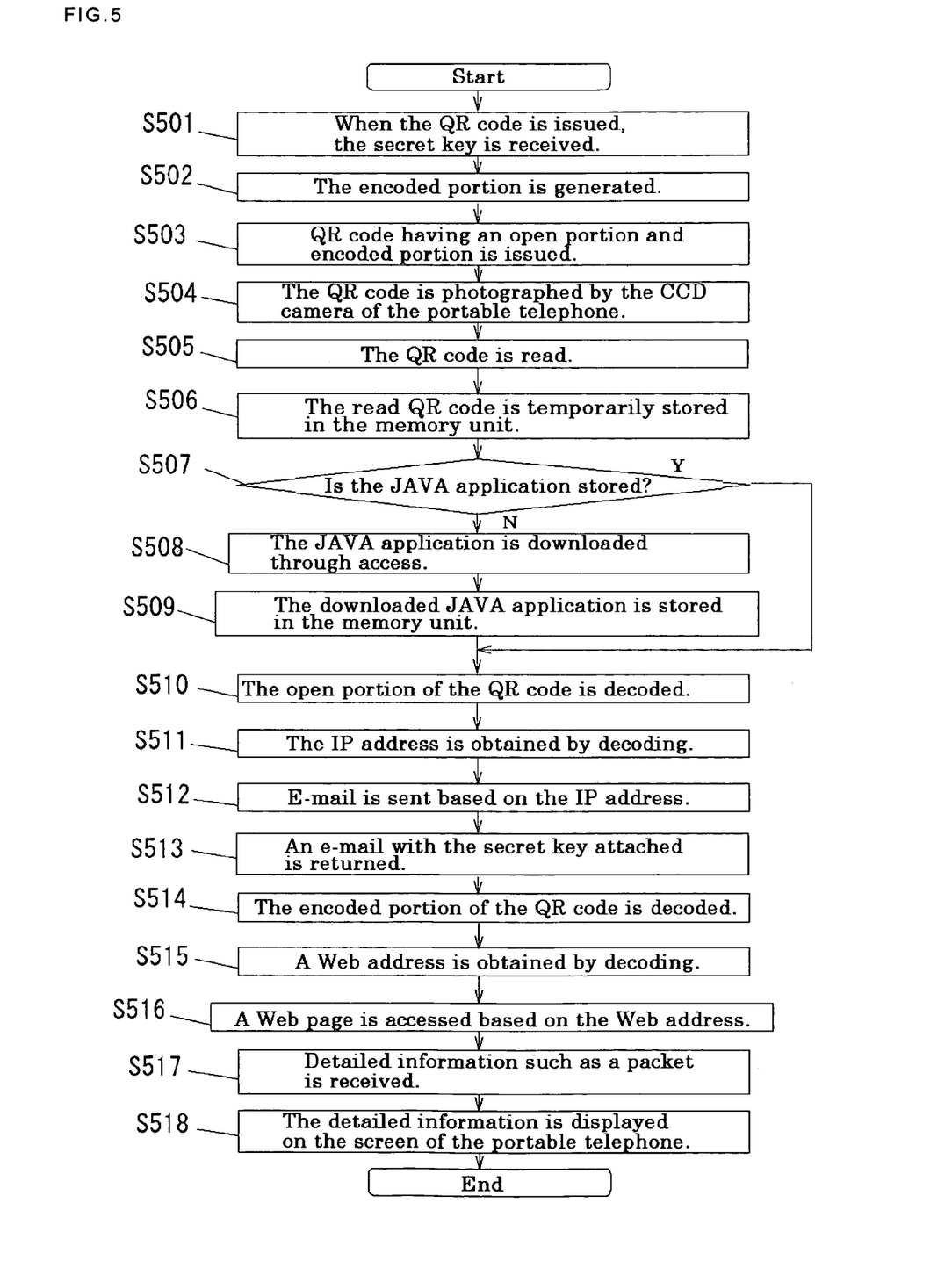
FIG. 5 is a flowchart for explaining the operation of the information-supply system that uses code information shown in FIG. 3.

FIG. 3 is a drawing showing a second embodiment in which the construction of the information-supply system that uses code information shown in FIG. 1 has been changed, and FIG. 4 and FIG. 5 are drawings for explaining the operation of the information-supply system that uses code information shown in FIG. 3. In the drawings explained below, the parts that are common with the parts in FIG. 1 are given the same reference numbers, and any redundant explanation is omitted.

In the information-supply system that uses 2-dimensional code information shown in FIG. 3, the advertiser-server system 20 comprises an open-key-management server 22 and a secret-key-management server 23.

The open-key-management server 22 controls an open key for decoding the encoded part of the QR code 51 as 2-dimensional code information for example, and this open key will be described later. The secret-key-management server 23 controls a secret key that is used when generating the encoded part of the QR code 51 that is to be issued by the code-issuing server system 10.

Here, as shown in FIG. 4 for example, the QR code 51 that is issued by the code-issuing-server system 10 has an open portion and an encoded portion. The open portion of the QR code 51 contains open information such as the IP address of the advertiser server system 20. Moreover, the encoded portion of the QR code 51 contains necessary information such as the encoded Web address. The secret key mentioned above is used when generating the encoded portion of the QR code 51. It is possible for the encoded portion of the QR code 51 to contain tag information such as CGI (Common Gateway Interface) information. In this case, the advertiser server system 20 can perform processing according to requests from the Web, as well as can provide the processed information to the portable telephone 30.

Here, several rows of URL information, for which it is desired to have the user jump to, are converted and encoded in the QR code 51. Two kinds of information are converted as information when converting URL information. One kind is the service destination management IP address of the open portion. The other is the necessary information of the encoded portion. More specifically, in the case where a distribution destination performs a mobile EC service using the company contents on the company site, the service destination management IP address that accumulates the information for this service (open portion) is taken to be 23476987, and the address of the mobile EC site that performs the service is taken to be 'www.m-service.com/mec/index.html'. In this example, the service destination management IP address '23476987' and the CGI tag information is decoded from the QR code information inside the portable telephone 30.

Next, processing jumps to the service destination management IP address '23476987'. Here, the secret key is received and obtained, then the address 'www.m-service.com/mec/index.html' of the mobile EC site that performs the serve is obtained and processing jumps to the service destination.

Next, the information-supply method of the information-supply system that uses 2-dimensional code information having this kind of configuration will be explained.

First, as shown in FIG. 5, when the code-issuing server system 10 issues QR code 51 according to a request from the advertiser for example, the secret key is received from the secret-key-management server 23 (step 501). By using this secret key, the encoded portion, which is the encoded part of the character string of the QR code 51, is generated (step 502). By generating that encoded portion, QR code 51 having both an open portion and encoded portion is issued (step 503). The issued QR code 51 is printed in printed materials 50 such as magazines and widely distributed.

When the QR code 51 that is printed in printed materials 50 such as magazines is photographed by the CCD camera of the portable telephone 30 (step 504), the CCD reading unit 31 reads that photographed QR code 51 (step 505). The QR code 51 that is read by the CCD reading unit 31 is temporarily stored in the memory unit 34 (step 506). After the QR code 51 has been stored in the memory unit 34, the decoding unit 32 decodes the QR code 51. At this time, decoding of the QR code 51 is executed by calling up the JAVA (registered trademark) application, which is the decoding software for decoding the QR code 51, from the memory unit 34, however when the JAVA (registered trademark) application is not stored in the memory unit 34 (step 507) the JAVA (registered trademark) application is downloaded by accessing the code-issuing-management server 11 as was described above (step 508). The downloaded JAVA (registered trademark) application is then stored in the memory unit 34 (step 509).

After the JAVA (registered trademark) application has been obtained in this way, the decoding unit 32 decodes the open portion of the QR code 51 (step 510). At this time, for example, the IP address of the advertiser server system 20 shown in FIG. 4 is obtained by decoding the QR code 51 (step 511), and the browser-phone-function unit 33 sends an e-mail based on that IP address (step 512).

At this time, an e-mail with the secret key attached is sent to the portable telephone 30 from which there was access according to the response from the secret-key-management server 23 of the advertiser server system 20 (step 513).

After the portable telephone 30 receives that secret key, the JAVA (registered trademark) application that is stored in the memory unit 34 decodes the encoded portion of the QR code 51 shown in FIG. 4 (step 514). Here, after the Web address is obtained from that encoded portion by decoding (step 515), the browser-phone-function unit 33 accesses the Web page based on that Web address (step 516). Also, after receiving detailed information such as a packet from the accessed destination (step 517), that detailed information is displayed on the screen of the portable telephone 30 (step 518).

In this way, in this second embodiment, there is an open portion and encoded portion in the 2-dimensional code information, and decoding of the encoded portion is performed according to a secret key that is obtained from the secret-key-management server 23 of the advertiser server system 20 that requested to issue the 2-dimensional code information, and various information from the advertiser server system 20 is supplied to the portable telephone 30 from which there was access based on the IP address of the open portion.

Moreover, since various information is supplied only to the portable telephone 30 from which there was access, not only does it become easy to manage the portable telephone 30 from which there was access, but it is also possible to easily create security and eliminate any improper use.

In this second embodiment, the case of decoding the encoded portion by the portable telephone 30 by using a secret key that is obtained from the secret-key-management server 23 was explained, however, the invention is not limited to this example, and when sending an e-mail from the portable telephone 30 based on the IP address, it is also possible to attach the encoded portion to that e-mail, and then to return the decoded information of that encoded portion from the secret-key-management server 23 to the portable telephone 30.

Also, in this second embodiment, the case was explained in which a Web address was contained in the encoded portion of the 2-dimensional code information, however, the invention is not limited to this example, and it is also possible for tags such as cgi, SSI, ASP or the like to be contained in that encoded portion. In this case, not only is it possible to increase the variation of kinds of information that can be supplied from the advertiser server system 20 according to these tags, but it is also possible to provide an environment that makes it easy for any kind of business to participate, and that makes it easy to create new businesses.

Also, in this second embodiment, by setting effective date and time information for the secret key in the secret-key-management server 23, it is possible to set an effective time limit for the code itself, therefore it is possible to limit access from code information that was given in back numbers of magazines for example, and it is possible to easily limit the effective period for entry access for a prize or present promotion. Moreover, in the case where code information linked to contents that violate public morality is released, or in the case where code information that is issued by some kind of improper procedure is released, it is possible to prevent improper use by having the secret-key-management server 23 remove correspondence to the information or destroy the secret key that corresponds to that information. In each of the embodiments described above, the case was explained in which the 2-dimensional code information was QR code, however, the invention is not limited to this example, and it is possible to use other code that has 2-dimensional information in the horizontal and vertical directions.

Also, in each of the embodiments described above, the case was explained in which 2-dimensional code information was photographed using a portable telephone 30 having an imaging function that uses a CCD camera, however, the invention is not limited to this example, and it is also possible to provide the portable telephone 30 with a function such as bluetooth or the like that decodes code information wirelessly. In this case, it is not necessary to install a CCD camera in the portable telephone 30.

Figure 6:
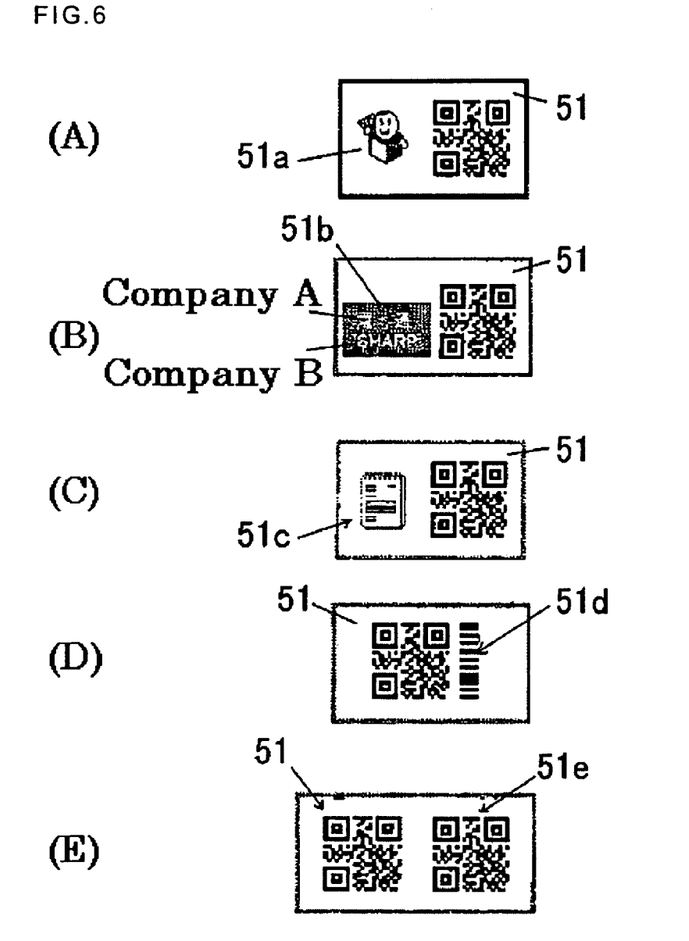
FIG. 6A to 6E are drawings for explaining cases in which the configuration of the code information shown in FIG. 1 has been changed.

Moreover, in each of the embodiments described above, the case was explained in which only QR code 51 was used as the 2-dimensional code information, however, the invention is not limited to this example, and as shown in FIG. 6, it also possible to add bitmap information to the QR code 51.

In other words, as shown in FIG. 6A, it is also possible to add bitmap information as an icon 51a for explaining the contents of the application. In this case, information such as the Web address and mail address, which are the contents of the QR code 51, is read by the portable telephone 30 together with the bitmap information. By displaying the bitmap information for the read icon 51a when referencing the information of the contents of the QR code 51 using the control screen of the portable telephone 30, it is possible to visually display those contents.

Also, as shown in FIG. 6B, it is possible to add bitmap information as a rectangular-shaped image 51b. The consortium of company A and company B is shown in this rectangular-shaped image 51b. In this case, the shape of the rectangular-shaped image 51b can be taken to be a verification key, and it is possible to prevent access to the consortium of company A and company B unless the shape of the rectangular-shaped image 51b is a specified shape, which is an effective measure from the aspect of security.

Also, as shown in FIG. 6C, bitmap information can be added as an application switch image 51c. In other words, by making the application switch image 51c an icon of a memo pad, an icon of a calling card, an icon for inventory, etc., it is possible to switch the application among memo-information software, calling-card-information software, inventory software, etc. that is to be activated by the QR code 51.

Also, as shown in FIG. 6D, it is possible to add another barcode 51d as the bitmap information. This barcode 51d information is read separately from the QR code 51, and based on this information, it is possible to change the operation of the application while reading or after reading the QR code 51. For example, it is possible to change the confirmation sound after the QR code 51 has been read. This barcode 51d could also be QR code.

Moreover, as shown in FIG. 6E, bitmap information can be added as extended QR code 51e. In this case, information for the advertisement itself can be contained in the QR code 51, and information about the printed materials in which the advertisement will be carried can be contained in the extended QR code 51e. By dividing the information into QR code 51 and extended QR code 51e in this way, it is possible to increase the speed of reading the QR code 51 or extended QR code 51e even when there is a large amount of information.

Figure 7:
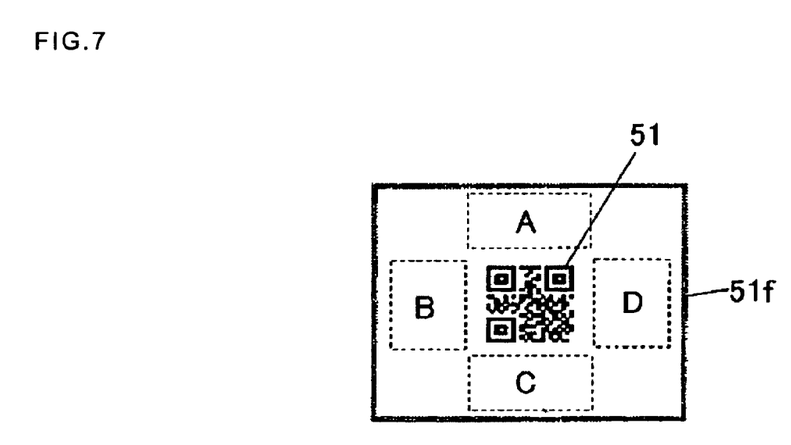
FIG. 7 is a drawing for explaining the case when the configuration of the code information shown in FIG. 1 has-been changed.

Also, as shown in FIG. 7, by changing the color of the rectangular line 51f that surrounds the QR code 51, it is possible to switch the function of the respective bitmap information. Also, by indicating the area of the bitmap information that is related to the QR code 51 by the graphic form 51f of the rectangular line that surrounds or is placed around the QR code 51 and by changing either the color or shape or both of that graphic form 51f it is possible to change the function of the respective bitmap information.

As a specific example of supplying information using this embodiment is a music trial-listening service that uses a portable telephone. This is a service in which after the QR code 51 printed at the side of new music information that is introduced in the music column of a town information magazine is photographed by the portable telephone 30, the photographed QR code 51 is decoded in the portable telephone 30, and for example, the service access number '45984521' is obtained and the information-supply server '45984521' is accessed, the secret key is received and the music trial-listening service destination is accessed, and after the music trial-listening service has been accessed, the music to be listened to flows to the portable telephone 30 from the server.

Also, there is a ticket-purchasing service that uses mobile commerce. This is a service in which, after QR code 51 that is printed in and advertisement for reserving theater tickets that are introduced in the advertisements of a newspaper, for example, is photographed by the portable telephone 30, the photographed QR code 51 is decoded in the portable telephone 30, and for example, the service access number '12345678' is obtained and the information-supply server '12345678' is accessed, the secret key is received and the ticket-reservation service destination is accessed. Also, by entering desired-date information after the ticket-reservation service destination has been accessed, it is possible for the portable telephone 30 to reserve the desired tickets.

Moreover, in the embodiments described above, the case was explained in which the QR code 51 is decoded by the decoding unit 32 of the portable telephone 30, however, the invention is not limited to this example, and it is possible to send the QR code 51 to be decoded to the code-issuing server system 10, for example, and then to receive the information of the QR code 51 that was decoded by the code-issuing server system 10. In this case, there is no need for a decoding unit 32 in the portable telephone 30.

INDUSTRIAL APPLICABILITY

As described above, with the information-supply system that uses code information of this invention, a code-issuing server system issues code information according to a request via a network, and an information-supply server system receives that issued code information via the network, then that received code information is managed and that code information is photographed by a portable terminal having an imaging function that uses an imaging element, a Web address that is contained in the photographed code information is obtained, and a Web page is accessed via the network using that obtained Web address, then an information-supply server system supplies information to the portable terminal via the network according to access from the portable terminal, so it is possible to easily and accurately direct a user to interactive media using code information.

EXPLANATION OF REFERENCE NUMBERS

10 Code-issuing server system
11 Code-issuing-management server
20 Advertiser server system
21 Advertiser server
22 Open-key-management server
23 Secret-key-management server
30 Portable telephone
31 CCD reading unit
32 Decoding unit
33 Browser-phone-function unit
34 Memory unit
5 Control unit
40 Internet
50 Printed materials
51 QR code
51a Icon
51b Rectangular-shaped image
51c Application switch image
51d Barcode
51e Extended QR code
51f Rectangular line

What is claimed is:

1. An information-supply system that uses code information comprising:

a code-issuing server system that encodes part of a character string to generate an encoded portion by a secret key and issues code information that is a combination of the encoded portion and an open portion including a Web address;

an information-supply server system that includes an open-key management server that manages an open key for decoding the encoded portion of said code information and an advertiser server that manages information supplied via a network; and a portable terminal having an imaging function that uses an imaging element, and that photographs said code information, obtains a Web address that is contained in the open portion by decoding said open portion of said photographed code information, and accesses a Web page via said network using said obtained Web address and sends an encoded portion that is contained in said code information;

wherein said information-supply server system decodes, using said open key, said encoded portion that is sent in response to access from said portable terminal based on a Web address obtained by decoding from said portable terminal and supplies information corresponding to the decoded encoded portion from said advertiser server to said portable terminal via said network.

2. The information-supply system that uses code information of claim 1 wherein;

said code-issuing server system comprises a code-issuing-management server that manages said issued code information and supplies a JAVA (registered trademark) application that is used on the side of said portable terminal to decode said code information; and wherein said information-supply server system comprises an information-supply server that supplies various kinds of information in response to access from said portable terminal using said Web address; and wherein said portable terminal comprises: a reading unit that uses said JAVA (registered trademark) application to extract and read said code information that was photographed by said imaging element; a decoding unit that uses said JAVA (registered trademark) application to decode said code information that was read by said reading unit; a browsing-function unit that by accessing said code-issuing-management server downloads said JAVA (registered trademark) application, and after accessing said Web page according to the Web address decoded by said decoding unit and receiving detailed information from the accessed destination, displays that detailed information; a memory unit that stores said code information read by said reading unit and said downloaded JAVA (registered trademark) application; and a control unit that controls the operation of each unit according to a specified control program.

3. The information-supply system that uses code information of claim 2 wherein;
when said decoding unit decodes said code information, and said control unit determines that said JAVA (registered trademark) application is not stored in said memory unit, said control unit sends an instruction to said browsing function unit to download said JAVA (registered trademark) application.

4. The information-supply system that uses code information of claim 1, wherein said portable terminal executes action according to the information of said decoded encoded portion.

5. The information-supply system that uses code information of claim 4 wherein an IP address is contained in the open portion of said code information, and information linked to said IP address is contained in said encoded portion.

6. The information-supply system that uses code information of claim 5 wherein said code information is at least 2-dimensional code.

7. The information-supply system that uses code information of claim 1 wherein said portable terminal executes a specified function according to information contained in said photographed code information.

8. The information-supply system that uses code information of claim 7 wherein said code information comprises at least 2-dimensional code and bitmap information in addition to this 2-dimensional code, and wherein the function of reading at least said 2-dimensional code or the operation after reading can be changed according to said bitmap information.

9. The information-supply system that uses code information of claim 1 wherein the Web address that is contained in said code information obtained on the side of said portable terminal is decoded on the side of said code-issuing server system.

10. An information-supply method that uses code information comprising:
encoding part of a character string to generate an encoded portion by a secret key and issuing code information that is a combination of that encoded portion and an open portion including a Web address by a code-issuing server system;
managing an open key for decoding the encoded portion of the code information by an open-key management server system of an information-supply server system;
managing information supplied via a network by an advertiser server of the information-supply server system; and
photographing said code information using a portable terminal having an imaging function that uses an imaging element; and
obtaining a Web address that is contained in the open portion by decoding the open portion of the photographed code information and accessing a Web page via the network using the obtained Web address and sending an encoded portion that is contained in the code information;
wherein the information-supply server system decodes the encoded portion that is sent in response to access from said portable terminal based on a Web address obtained by decoding from the portable terminal by the open key and supplies information corresponding to the decoded encoded portion from the advertiser server to the portable terminal via the network.

11. The information-supply method that uses code information of claim 10, further comprising:
managing said issued code information by a code-issuing-management server, and supplying a JAVA (registered trademark) application to be used by said portable terminal for decoding said code information;
supplying various kinds of information by an information-supply server in response to access using said Web address from said portable terminal;
using the JAVA (registered trademark) application by a reading unit of said portable terminal to extract and read said code information that was photographed by the imaging element;
using said JAVA (registered trademark) application by a decoding unit of said portable terminal to decode said code information read by said reading unit;
downloading said JAVA (registered trademark) application by accessing said code-issuing-management server by a browsing-function unit of said portable terminal, and then accessing said Web page based on the Web address decoded by said decoding unit, receiving detailed information from the accessed destination and displaying that detailed information;
storing said code information read by said reading unit and said downloaded JAVA (registered trademark) application in a memory unit of said portable terminal; and
controlling the operation of each unit by a control unit of said portable terminal according to a specified control program.

12. The information-supply method that uses code information of claim 11, further comprising:
sending an instruction to said browsing-function unit to download said JAVA (registered trademark) application when it is determined that said JAVA (registered trademark) application is not stored in said memory unit when said decoding unit decodes said code information.

13. The information-supply method that uses code information of claim 10, wherein an IP address is contained in the open portion of said code information and a Web address is contained in said encoded portion.

14. The information-supply method that uses code information of claim 10, wherein said code information is at least 2-dimensional code.

15. The information-supply method that uses code information of claim 10 wherein the Web address contained in the code information obtained on the side of said portable terminal is decoded on the side of said code-issuing server system.

16. A recording medium on which a program is recorded that executes the information-supply method that uses code information of claim 10.

* * * * *

UNITED STATES PATENT AND TRADEMARK OFFICE
CERTIFICATE OF CORRECTION

PATENT NO. : 7,490,134 B2  
APPLICATION NO. : 10/503011  
DATED : February 10, 2009  
INVENTOR(S) : Yuji Ono et al.

It is certified that error appears in the above-identified patent and that said Letters Patent is hereby corrected as shown below:

Title page, Item 73 is Dentsu, Inc., Tokyo (JP) correct to include assignees --Dentsu Tec Inc. Tokyo (JP), and Sharp Corporation., Osaka (JP)--.

Please list the order of assignees as follows:

Dentsu Tec Inc., Tokyo (JP), assignment recorded on December 13, 2004, at reel 016062, frame 0307.

Dentsu Inc., Tokyo (JP), assignment for Dentsu Inc., Tokyo (JP) was recorded on December 13, 2004, at reel 016062, frame 0042.

Sharp Corporation, Osaka (JP), assignment was recorded on December 13, 2004, at reel 016074, frame 0831.

Signed and Sealed this

Seventh Day of September, 2010

David J. Kappos  
*Director of the United States Patent and Trademark Office*